United States Patent [19]
Siegenthaler

[11] Patent Number: 6,105,646
[45] Date of Patent: Aug. 22, 2000

[54] METAL TIRE BEAD

[75] Inventor: Karl J. Siegenthaler, Pratteln, Switzerland

[73] Assignee: Bridgestone Corporation, Tokyo, Japan

[21] Appl. No.: 09/103,607

[22] Filed: Jun. 24, 1998

Related U.S. Application Data

[62] Division of application No. 08/942,881, Oct. 2, 1997, Pat. No. 5,820,717.

[30] Foreign Application Priority Data

Oct. 14, 1996 [IT] Italy .................................. TO96A0812

[51] Int. Cl.$^7$ .................................................. B60C 15/04
[52] U.S. Cl. .......................... 152/540; 152/539; 245/1.5
[58] Field of Search .................................. 156/136, 422, 156/130.7, 117, 460; 152/540, 539; 245/1.5

[56] References Cited

U.S. PATENT DOCUMENTS

| | | |
|---|---|---|
| 1,189,666 | 7/1916 | Coesir . |
| 1,686,155 | 10/1928 | Hopkins . |
| 3,026,762 | 3/1962 | Jordan ........................................... 87/8 |
| 3,881,526 | 5/1975 | Bell et al. ............................... 140/92.2 |
| 4,039,015 | 8/1977 | Pakur et al. ......................... 152/362 R |
| 4,452,660 | 6/1984 | Davies et al. ........................... 156/422 |
| 4,484,974 | 11/1984 | Rothman ................................. 156/425 |

FOREIGN PATENT DOCUMENTS

| | | |
|---|---|---|
| 0 320 221 A1 | 6/1989 | European Pat. Off. . |
| 0 433 917 A1 | 6/1991 | European Pat. Off. . |
| 27 26 374 A 1 | 3/1979 | Germany . |

Primary Examiner—Geoffrey L Knable
Attorney, Agent, or Firm—Sand & Sebolt

[57] ABSTRACT

To form a metal bead for a tire, two integral portions of a single length of wire are wound in opposite directions about an axis to form a bundle; and the free ends of the two portions are positioned substantially coaxially and adjacent to each other along the outer periphery of the bundle, and are connected integrally to each other to form a bead with a substantially constant section along its whole length.

12 Claims, 7 Drawing Sheets

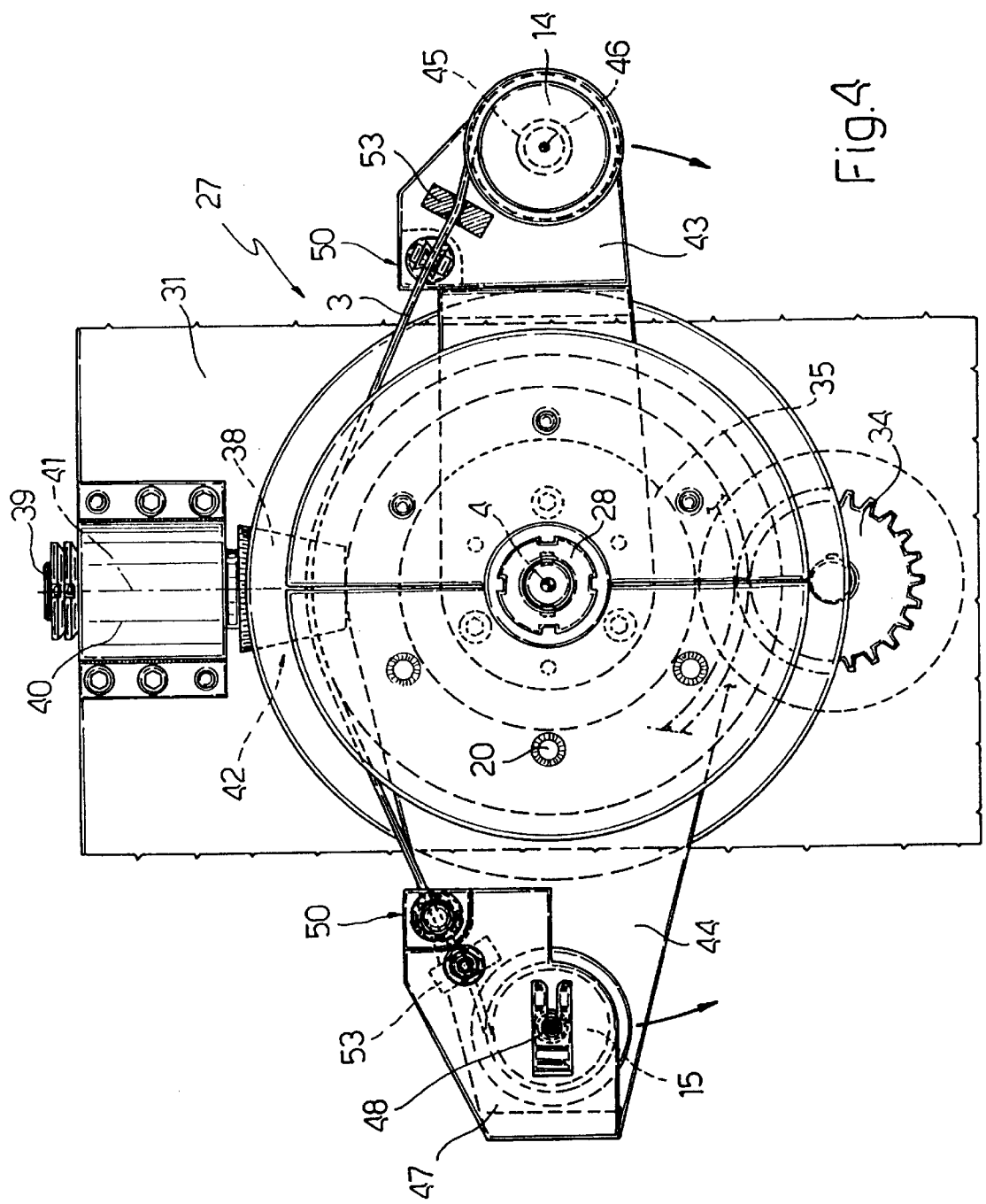

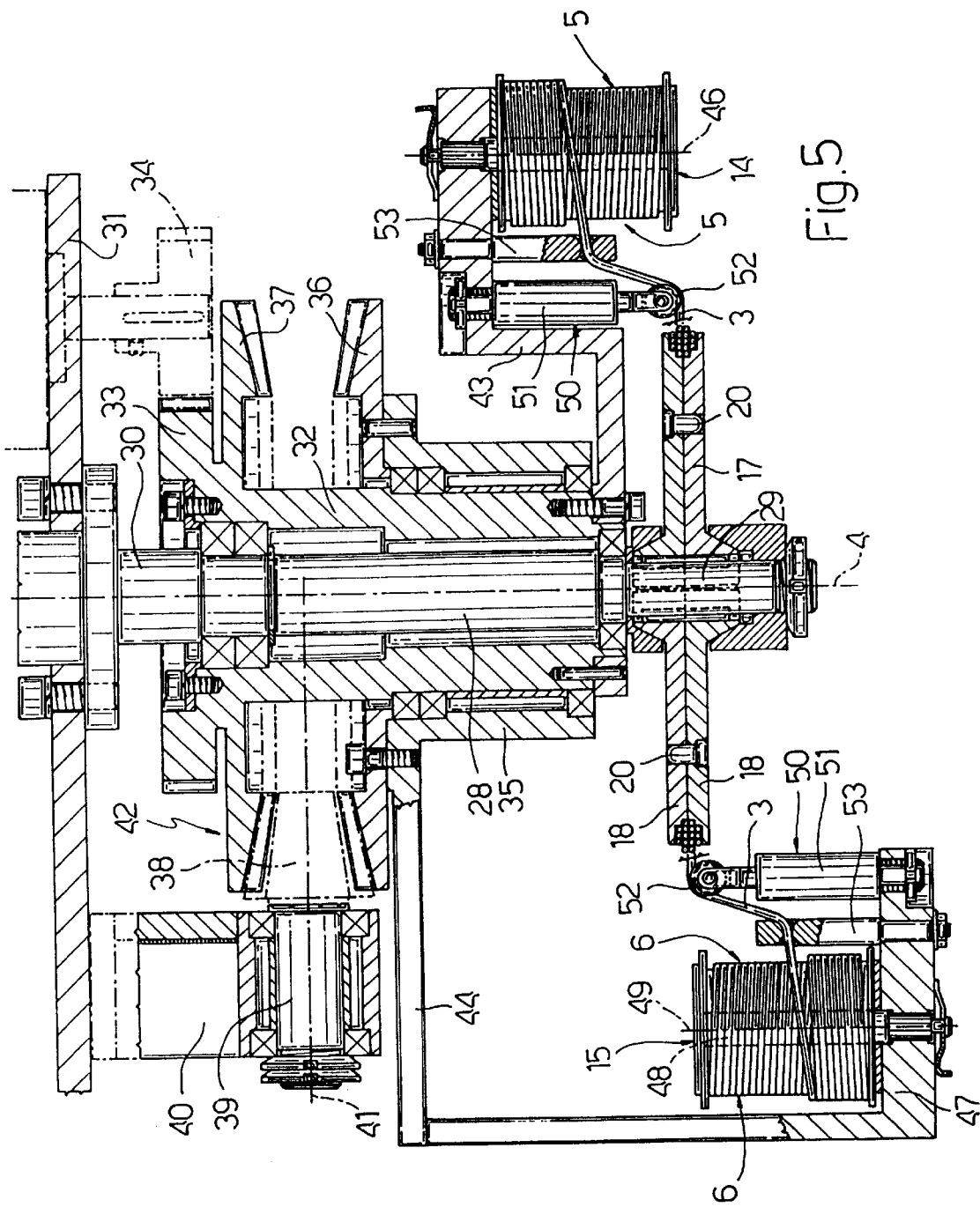

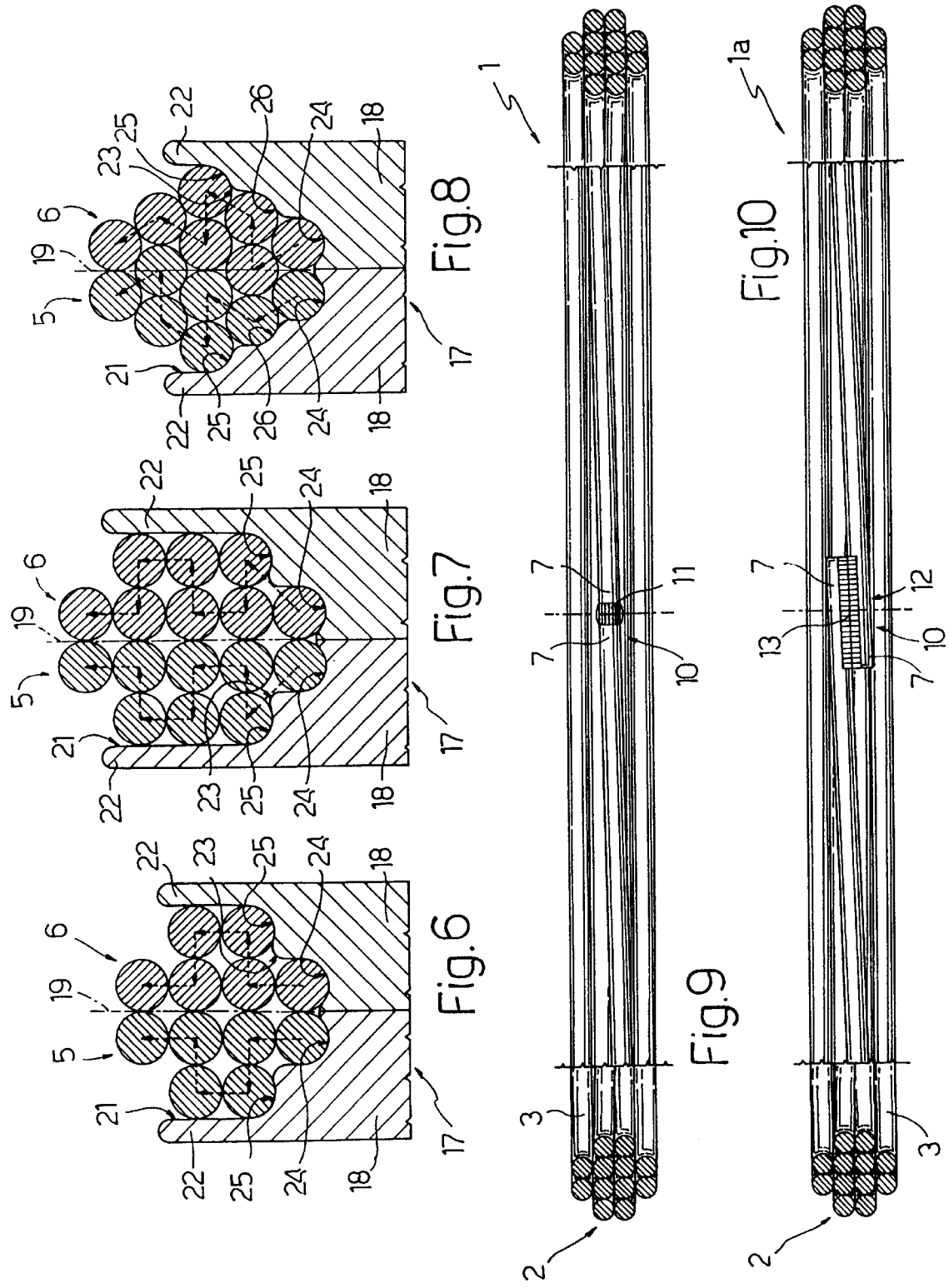

METAL TIRE BEAD

CROSS REFERENCE TO RELATED APPLICATION

This application is a Divisional Application of currently pending U.S. patent application Ser. No. 08/942,881, filed on Oct. 2, 1997, now U.S. Pat. No. 5,820,717, the disclosures of which are incorporated herein by reference.

BACKGROUND OF THE INVENTION

The present invention relates to a method of manufacturing a metal tire bead.

Metal tire beads normally comprise an annular bundle defined by a single length of wire wound substantially into a coil, and having a first and second end located along the inner and outer periphery of the bundle respectively.

Bundles of the above type involve several drawbacks. Firstly, the bundle comprises an outer turn, which is free with respect to the rest of the bundle and incapable of absorbing any stress; and secondly, the discontinuity in thickness at each end of the length of wire forming the bundle undoubtedly results in uneven mass distribution about the rotation axis of the tire.

SUMMARY OF THE INVENTION

It is an object of the present invention to provide a method of manufacturing a bead designed to overcome the aforementioned drawbacks.

More specifically, it is an object of the present invention to provide a method of producing a bead having a substantially constant section along its whole length.

According to the present invention, there is provided a method of manufacturing a metal bead for a tire, the bead comprising a bundle in turn comprising a length of wire wound substantially into a coil about an axis to impart a toroidal shape to the bundle; and the method being characterized by comprising the steps of determining an intermediate point along said length of wire, to define, on the length of wire, two portions, each of which comprises a first free end and a second end integral with the second end of the other portion at said intermediate point; placing said intermediate point on an outer periphery of a substantially cylindrical forming core coaxial with said axis; winding said two portions substantially into a coil and in opposite directions about said core to define the bundle and position said two first ends at an outer periphery of the bundle; and connecting said two first ends integral with each other.

The present invention also relates to a bead formed using the above method.

According to the present invention, there is provided a metal bead for a tire, the bead comprising a bundle in turn comprising a continuous length of wire wound substantially into a coil about an axis to impart a toroidal shape to the bundle; and being characterized in that said length of wire comprises two portions, each of which comprises a first free end and a second end integral with the second end of the other portion at an inner peripheral point of said bundle; said two portions being wound in opposite directions about said axis and as of said inner peripheral point; said first ends being located at an outer periphery of said bundle; and connecting means being provided for connecting said two first ends integral with each other.

BRIEF DESCRIPTION OF THE DRAWINGS

A number of non-limiting embodiments of the present invention will be described by way of example with reference to the accompanying drawings, in which:

FIG. 4 shows a plan view of the FIG. 3 device;

FIG. 5 shows an axial section of FIG. 4, in which, for the sake of simplicity, part of the device is rotated 90°;

FIGS. 6 to 8 show partial cross sections of three different embodiments of a detail in FIG. 2;

FIG. 9 shows a plan view of the FIG. 1 bead;

FIG. 10 shows a plan view of a variation of the FIG. 1 bead;

DETAILED DESCRIPTION OF THE INVENTION

Figure 1:
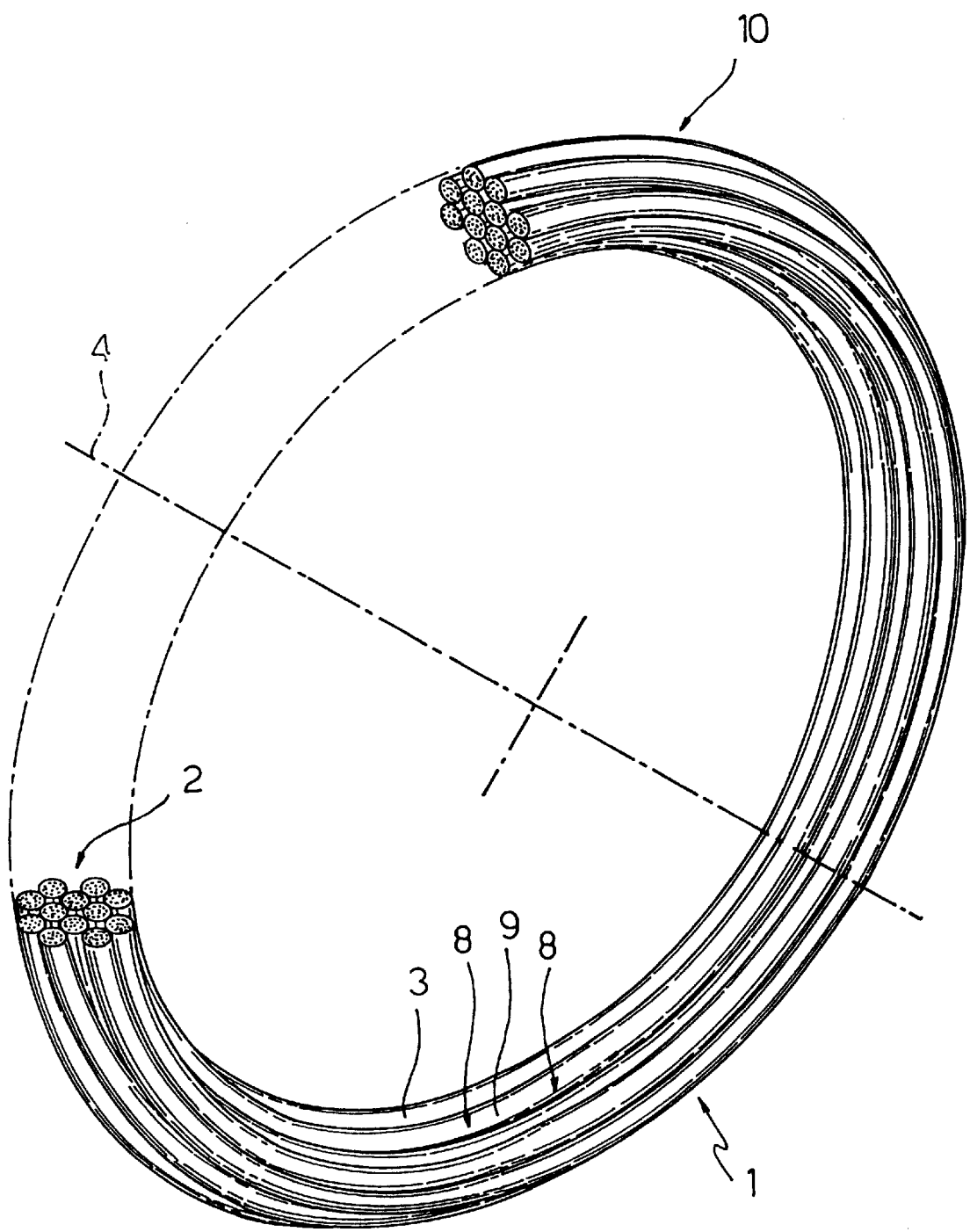
FIG. 1 shows a view in perspective, with parts removed for clarity, of a preferred embodiment of the bead according to the present invention.

Number 1 in FIG. 1 indicates a metal bead for a road vehicle tire (not shown).

Bead 1 is substantially toroidal, and comprises a bundle 2 defined by a single continuous length 3 of wire wound substantially into a coil about an axis 4. More specifically, length 3 of wire comprises two portions 5, 6 (FIG. 2), which, in the example shown, are identical and define two halves of length 3, but which in other embodiments may be of different lengths. Each portion 5, 6 comprises a first free end 7, and a second end 8 integral with the second end 8 of the other portion 6, 5 at an intermediate point of length 3 located at an inner peripheral point 9 of bundle 2. Portions 5 and 6 are wound in opposite directions about axis 4 and as of point 9, so that the two first ends 7 are located at an outer periphery 10 of bundle 2 (FIGS. 9 and 10). In the FIG. 9 embodiment, the two ends 7 are coaxial, substantially contact each other, and are connected integral with each other by means of a weld spot 11.

The FIG. 10 variation shows a bead 1a substantially identical to bead 1, except that the two ends 7, as opposed to being coaxial, are located side by side and parallel to each other along respective portions 12, and are connected integral with each other by means of a linear weld 13 extending along substantially the whole length of portions 12.

Figure 2:
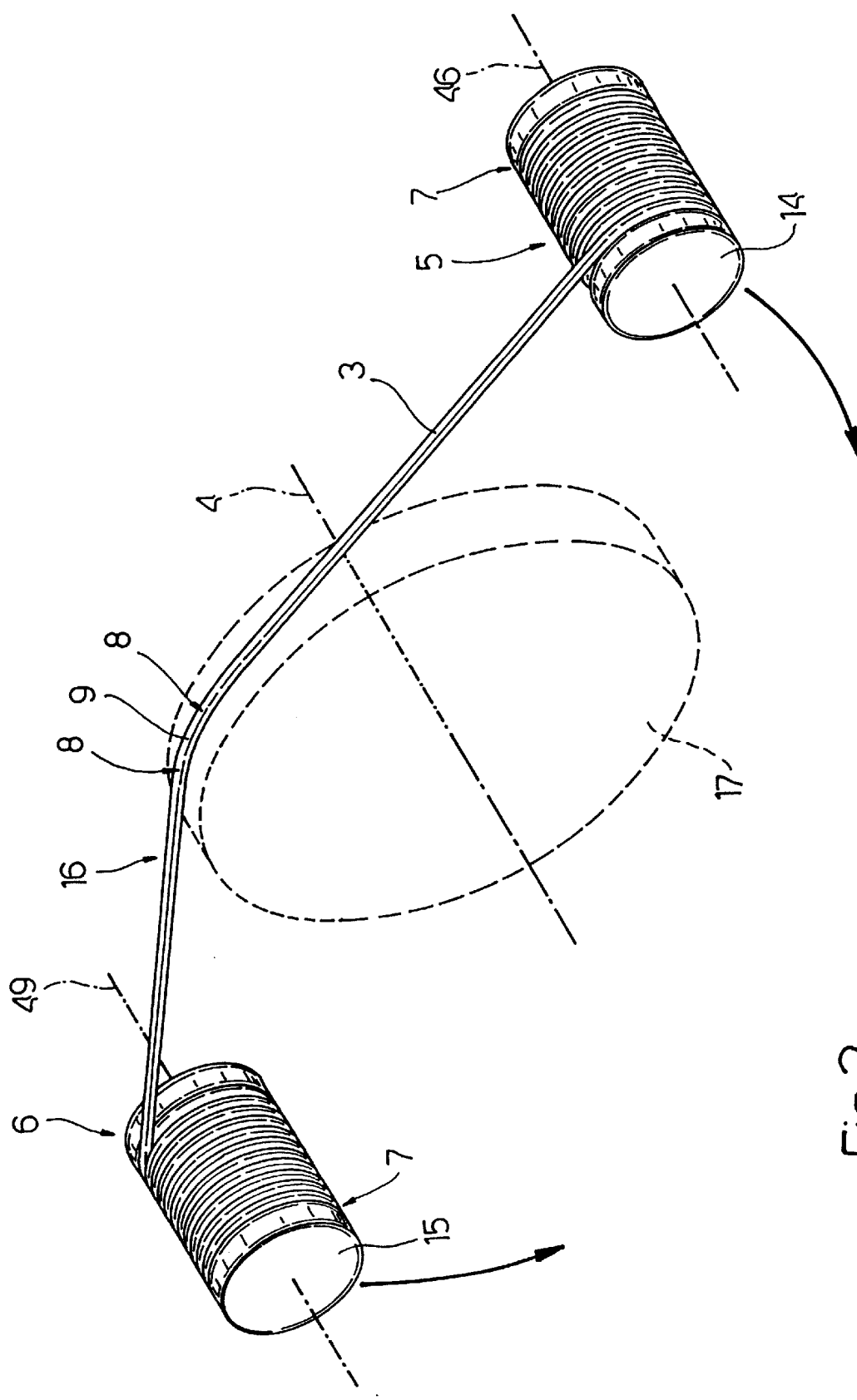
FIG. 2 shows a schematic view of a device for producing the FIG. 1 bead according to the method of the present invention.

With reference to FIG. 2, bead 1 may be formed by winding portions 5 and 6 in opposite directions onto respective spools 14 and 15 so that an intermediate portion 16 of length 3 comprising point 9 is left free; placing portion 16, at point 9, onto the outer periphery of a forming core 17; and winding portions 5 and 6 in opposite directions about core 17 and simultaneously off spools 14 and 15. Length 3 of wire is of such a length that, when portions 5 and 6 are unwound completely off spools 14 and 15, the two ends 7 are located facing and adjacent to each other for connection by means of weld spot 11. In the case of bead 1a, on the other hand, length 3 of wire is of such a length that, when portions 5 and 6 are unwound completely off spools 14 and 15, the two ends 7 are located side by side and parallel to each other for connection by means of linear weld 13.

As shown in FIGS. 6, 7 and 8, cylindrical forming core 17 comprises a disk—hereinafter referred to as "disk 17" —coaxial with axis 4 and defined by two plates 18, which are coaxial with each other and with axis 4, are positioned contacting each other along a mid plane 19 perpendicular to axis 4, and are connected to each other by fastening elements 20 (FIG. 5).

The two plates 18 define a peripheral annular groove 21 having a substantially U-shaped section and for housing bundle 2. Groove 21 is defined axially by two shoulders 22, and radially by an undulated surface 23, which defines a number of annular recesses for housing respective turns of bundle 2, and has a section symmetrical with respect to plane 19. More specifically, in the FIG. 6 and 7 variations, undulated surface 23 defines a pair of inner recesses 24 adjacent to, and on either side of, plane 19; and a pair of outer recesses 25 located on either side of plane 19, both radially and axially outwards of respective recesses 24, and adjacent to respective shoulders 22. In the FIG. 8 variation, on the other hand, a further intermediate recess 26 is provided between each recess 24 and respective recess 25. The distances, measured parallel to axis 4, between each recess 24, 26, 25 of one plate 18 and the corresponding recess 24, 26, 25 of the other plate 18 are equal to whole numbers of diameters of length 3 of wire, which numbers increase from recesses 24 to recesses 25.

FIGS. 6 to 8 show three different winding sequences, all of which commence by simultaneously filling inner recesses 24. More specifically, the sequences shown in FIGS. 6 and 7 are substantially similar, in that each of portions 5 and 6 is kept on a respective side of plane 19 at all times, and the more outer turns formed by each portion 5, 6 are superimposed on the respective more inner turn s until bead 2 is completed. In the FIG. 8 sequence, on the other hand, the more outer turns formed by each of portions 5 and 6 are offset with respect to the more inner turns, and some of the turns of each of portions 5 and 6 are inserted combfashion between two adjacent turns of the other portion 6, 5 and astride plane 19.

Figure 3:
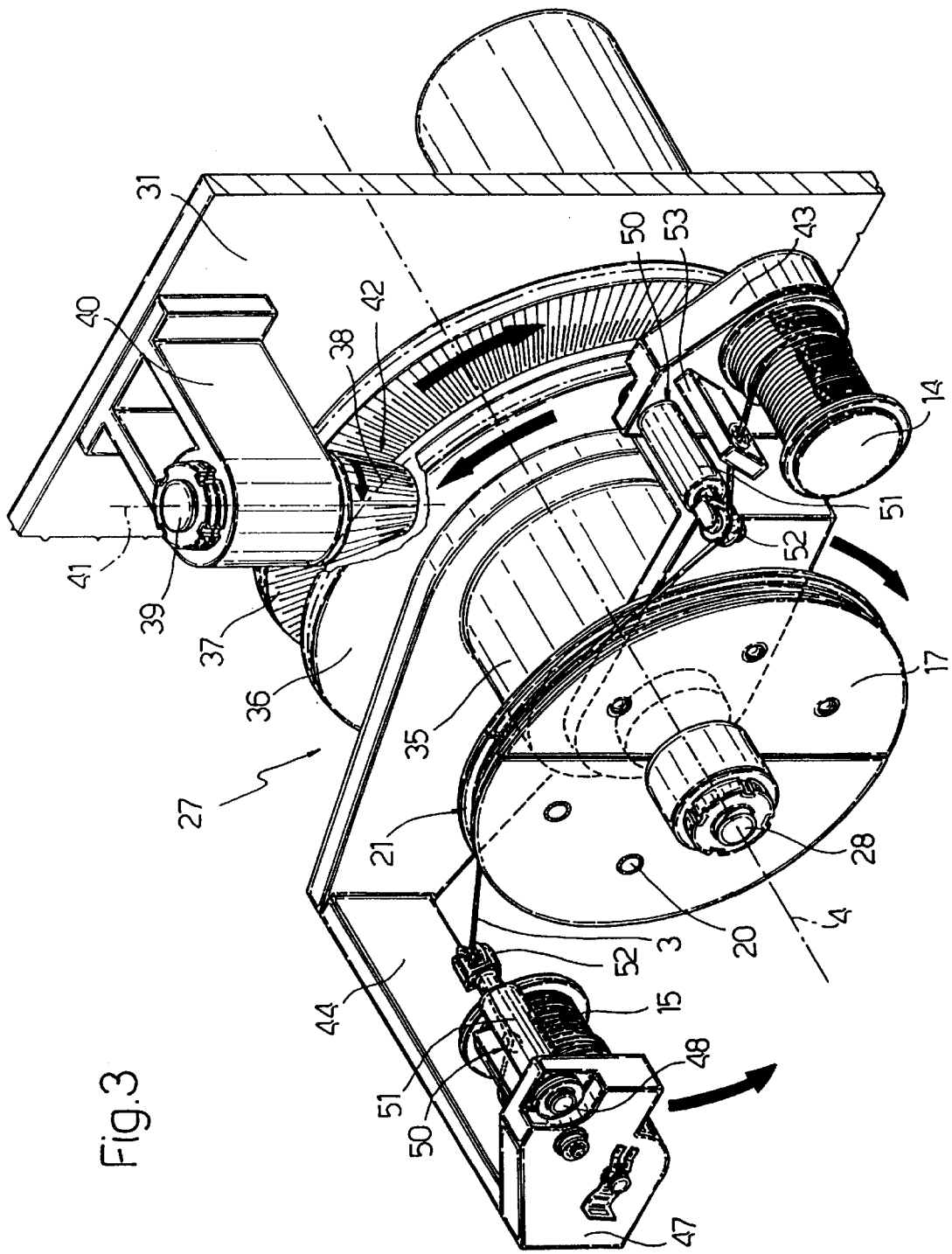
FIG. 3 shows a schematic view in perspective of a preferred embodiment of the FIG. 2 device.

The above winding methods are preferably implemented, as shown in FIGS. 3, 4 and 5, by means of a winding device 27, wherein disk 17 is fitted to a shaft 28 coaxial with axis 4 and having a first portion 29 supporting disk 17, and a second portion 30 connected integral with a fixed frame 31.

A tubular body 32, coaxial with axis 4, is mounted for rotation about shaft 28, and is fitted integrally with a gear 33 coaxial with axis 4 and meshing with a powered gear 34 for rotating gear 33, together with tubular body 32, about axis 4.

Tubular body 32 is fitted idly with a sleeve 35, one end of which is fitted integrally with a bevel gear 36 facing a further bevel gear 37 integral with tubular body 32. Gears 36 and 37 are coaxial with each other and with axis 4, are positioned oppositely conical, and mesh simultaneously with a bevel pinion 38 fitted integrally to one end of a shaft 39, which is fitted idly to a support 40 integral with frame 31, so as to rotate about a respective axis 41 perpendicular to axis 4. Together with pinion 38, gears 36 and 37 define a transmission 42, whereby rotation of gear 36 in one direction corresponds to the same rotation of gear 37 in the opposite direction.

Tubular body 32 and sleeve 35 comprise respective radial arms 43 and 44, which are maintained diametrically opposite by transmission 42, and are fitted idly with respective spools 14 and 15. More specifically, arm 43 is connected integrally to the free end of tubular body 32 opposite the end facing frame 31 and fitted with gear 33, and is fitted, at an end portion, with a pin 45, which has an axis 46 parallel to axis 4, projects from arm 43 on the opposite side of arm 43 to frame 31, and idly supports spool 14. Arm 44, on the other hand, is substantially C-shaped, and comprises an end portion 47 fitted with a pin 48, which has an axis 49 parallel to axis 4, projects from portion 47 towards frame 31, and idly supports spool 15. Spools 14 and 15 are identical, and are wound in the same direction with respective portions 5 and 6 of length 3 of wire. As spools 14 and 15, however, are positioned parallel to each other but facing in opposite directions, portions 5 and 6 are wound in opposite directions with respect to the reference constituted by frame 31.

Each arm 43, 44 is provided, close to respective spool 14, 15, with a control device 50 comprising a linear actuator 51 parallel to axis 4 and fitted on the end with a guide roller 52 facing and adjacent to the periphery of disk 17, and which is engaged by respective portion 5, 6 as this is unwound off respective spool 14, 15. Device 50 also comprises a central control unit (not shown) for moving roller 52, and hence respective portion 5, 6, transversely in a direction parallel to axis 4, and so performing the sequences described previously with reference to FIGS. 6 to 8.

A guide element 53 is also provided between each spool 14, 15 and respective roller 52, is fitted to respective arm 43, 44, and provides for directing length 3 of wire correctly from spool 14, 15 towards control device 50.

Operation of device 27 is clearly understandable from the foregoing description without any further explanation. By virtue of transmission 42 rotating tubular body 32 and sleeve 35 similarly but in opposite directions about axis 4, operation of gear 34 causes spools 14 and 15 to revolve similarly but in opposite directions about axis 4 and the periphery of disk 17, so that spools 14 and 15 are gradually unwound to gradually form bundle 2 according to one of the sequences described with reference to FIGS. 6 to 8, and as described with reference to FIG. 2.

Figure 12:
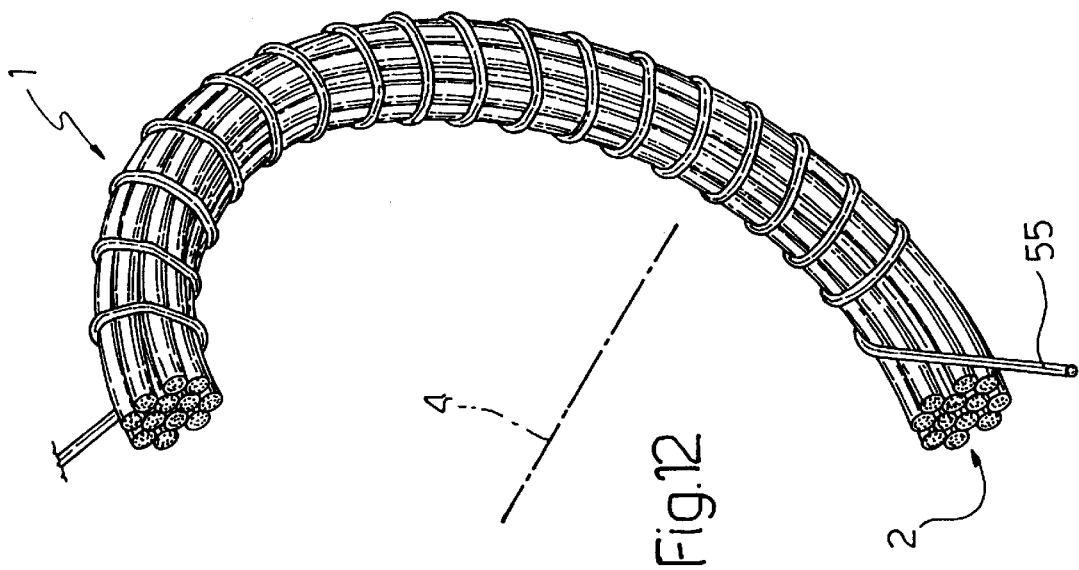
FIGS. 11 and 12 show partial views in perspective of two different ways of completing the beads in FIGS. 1 and 7.
Figure 11:
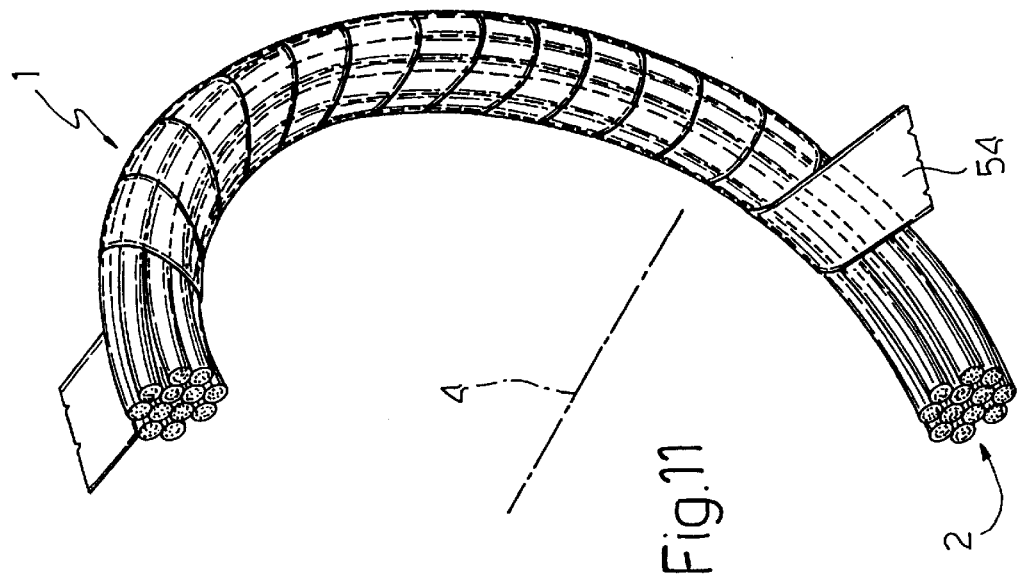

Once completed, bundle 2 is removed by parting the two plates 18; and, as shown in FIGS. 11 and 12, bundle 2 is then wound either with a strip 54 of elastomeric material covering it completely, or with a cord 55 of heat-shrink material, to secure the turns of bundle 2 to one another.

The bead formed as described above affords the advantage of continuity and, hence, uniformity along the whole of its length. In particular, the absence of any discontinuity provides for greater resistance to radial stress and greater rigidity of the bead, and also for better balance of the relative tire.

I claim:

1. A metal bead for a tire, the bead comprising a bundle of winds in turn including a continuous length of wire wound substantially into a coil about an axis to impart a toroidal shape to the bundle; and being characterized in that said length of wire includes two portions, each of which includes a first free end and a second end integral with the second end of the other portion at an inner peripheral point of said bundle; said two portions being wound in opposite directions about said axis from said inner peripheral point; said first ends being located at an outer periphery of said bundle; said first ends being disposed in the radially outermost winds of the bundle; and connecting means being provided for connecting said two first ends integral with each other.

2. A bead as claimed in claim 1, characterized in that said first ends are positioned coaxial and facing each other.

3. A bead as claimed in claim 2, characterized in that said connecting means comprise a weld spot interposed between said facing first ends.

4. A bead as claimed in claim 1, characterized in that said first ends are positioned parallel and side by side along respective end portions of a given length.

5. A bead as claimed in claim 2, characterized in that said connecting means comprise a continuous weld extending along said end portions.

6. A bead as claimed in claim 1, characterized by comprising a reinforcing element wound about said bundle.

7. A bead as claimed in claim 6, characterized in that said reinforcing element is a strip of elastic material.

8. A bead as claimed in claim 6, characterized in that said reinforcing element is a cord of heat-shrink material.

9. A metal bead for a tire, the bead comprising a bundle of winds in turn including a continuous length of wire wound substantially into a coil about an axis to impart a toroidal shape to the bundle; and being characterized in that said length of wire includes two portions, each of which includes a first free end and a second end integral with the second end of the other portion at an inner peripheral point of said bundle; said two portions being wound in opposite directions about said axis from said inner peripheral point; said first ends being located at an outer periphery of said bundle; connecting means being provided for connecting said two first ends integral with each other; and said bundle having a section having a plane of symmetry perpendicular to said axis; each said portion defining turns which are all located on a respective same side of said plane.

10. A bead as claimed in claim 9, characterized in that each turn of each said portion is superimposed directly on a corresponding more inner turn, if such a more inner turn exists.

11. A metal bead for a tire, the bead comprising a bundle of winds in turn including a continuous length of wire wound substantially into a coil about an axis to impart a toroidal shape to the bundle; and being characterized in that said length of wire includes two portions, each of which includes a first free end and a second end integral with the second end of the other portion at an inner peripheral point of said bundle; said two portions being wound in opposite directions about said axis from said inner peripheral point; said first ends being located at an outer periphery of said bundle; connecting means being provided for connecting said two first ends integral with each other; and said bundle having a section having a plane of symmetry perpendicular to said axis; each said portion defining turns of which a portion are inserted combfashion between two adjacent turns of the other portion and astride said plane.

12. A bead as claimed in claim 11, characterized in that each turn of each said portion is offset with respect to a corresponding more inner turn, if such a more inner turn exists.

* * * * *